United States Patent [19]

Shu et al.

[11] Patent Number: 5,222,557

[45] Date of Patent: Jun. 29, 1993

[54] SAND CONTROL AGENT AND PROCESS

[75] Inventors: Paul Shu, Cranbury, N.J.; E. Thomas Strom; William P. Donlon, both of Dallas, Tex.

[73] Assignee: Mobil Oil Corporation, Fairfax, Va.

[21] Appl. No.: 810,585

[22] Filed: Dec. 19, 1991

Related U.S. Application Data

[63] Continuation-in-part of Ser. No. 622,587, Dec. 3, 1990, Pat. No. 5,101,901.

[51] Int. Cl.$^5$ .................................... E21B 33/138
[52] U.S. Cl. .................................... 166/276; 166/292; 166/293; 166/297; 166/300
[58] Field of Search .............. 166/276, 292, 293, 294, 166/295, 297, 300

[56] References Cited

U.S. PATENT DOCUMENTS

| | | | |
|---|---|---|---|
| 3,012,405 | 12/1961 | Caron | 166/293 X |
| 3,097,694 | 7/1963 | Kerver | 166/276 |
| 3,434,540 | 3/1969 | Stein | 166/250 |
| 3,708,013 | 1/1973 | Dismukes | 166/276 |
| 3,756,318 | 9/1973 | Stein et al. | 166/278 |
| 3,918,521 | 11/1975 | Snavely, Jr. et al. | 166/272 |
| 3,983,941 | 10/1976 | Fitch | 166/276 |
| 4,304,301 | 12/1981 | Sydansk | 166/292 |
| 4,381,665 | 5/1983 | Levine et al. | 73/73 |
| 4,440,227 | 4/1984 | Holmes | 166/261 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,549,608 | 10/1985 | Stowe et al. | 166/280 |
| 4,669,542 | 6/1987 | Venkatesan | 166/258 |
| 4,785,883 | 11/1988 | Hoskin et al. | 166/270 |
| 4,945,991 | 8/1990 | Jones | 166/278 |
| 5,101,901 | 4/1992 | Shu et al. | 166/276 |

Primary Examiner—George A. Suchfield
Attorney, Agent, or Firm—A. J. McKillop; G. W. Hager; C. A. Malone

[57] ABSTRACT

A method for forming a gravel pack in a washed-out interval is provided where a borehole penetrates an unconsolidated or loosely consolidated oil or gas reservoir which is likely to introduce substantial amounts of sand into the borehole. After perforating the borehole's casing at a washed-out interval of the formation, sand is introduced into the interval. Afterwards, an aqueous silicate slug is injected into said interval. Next, a spacer volume of a water-immiscible hydrocarbonaceous liquid is introduced into the interval. Thereafter, a water-miscible organic solvent slug, containing an alkylpolysilicate and an inorganic or organic salt or a chelated calcium mixture, is injected into the interval. A permeability retaining silicate cement is formed in the interval thereby making a gravel pack. Injection of the aqueous silicate slug spacer volume and organic solvent EPS mixture are continued until the porosity of the interval has been reduced by the silicate cement to an extent sufficient to exclude formation fines and sand.

25 Claims, 1 Drawing Sheet

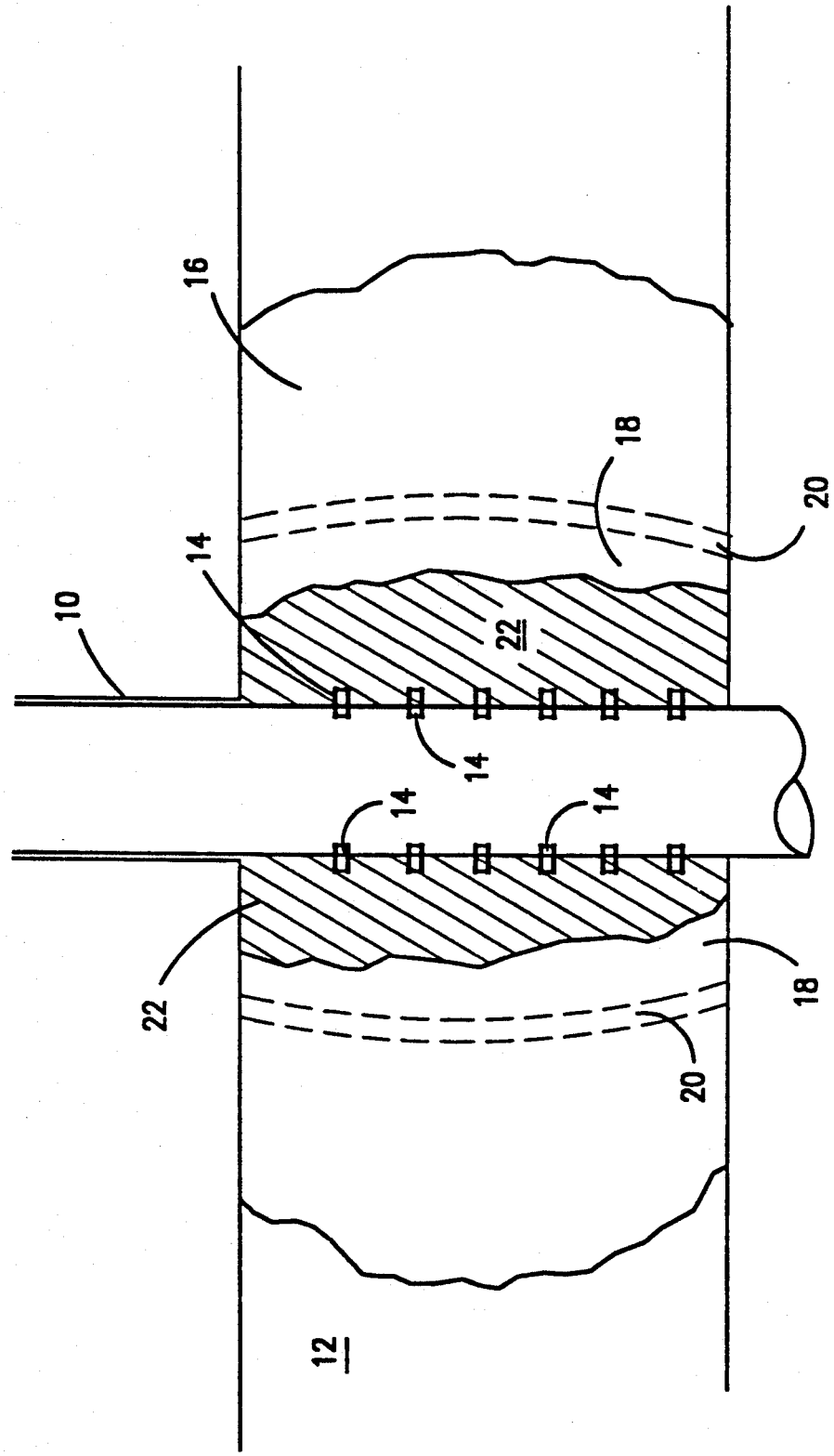

SAND CONTROL AGENT AND PROCESS

This application is a continuation-in-part of Ser. No. 07/622,587, now U.S. Pat. No. 5,101,901, which was filed on Dec. 3, 1990.

FIELD OF THE INVENTION

This invention relates to a method for gravel packing formations where a permeability retentive silicate cement is used in combination with a gravel pack operation to minimize formation damage and prevent fines migration.

BACKGROUND OF THE INVENTION

Sand consolidation and gravel packing are two near wellbore techniques widely used for controlling the production of sand from producing wells such as oil wells, gas wells and similar boreholes. In many instances, highly porous and fragmentable sand formations surround a wellbore. Under production conditions, the sand is often displaced from its aggregated structure and carried along by the fluid flood operations to a producing well. If the sand flow is allowed to proceed unchecked, the producing wellbore soon becomes full of sand, thereby clogging the wellbore and impeding oil production. Furthermore, sand arriving at the surface site of the well erodes the production hardware.

As more and more sand is displaced from its original formation, a region of wash-out cavities surrounding the wellbore region results. As the wash-out zones become more extensive, the integrity of the wellbore is threatened and a danger of the wellbore collapsing exists.

It has therefore been the subject of extensive and intense research by the petroleum industry to develop techniques to minimize or obviate displacement of sand particles into producing well areas and prevent the formation of wash-out cavities surrounding the wellbore. One such general approach suggested by the art is to consolidate the coarse sand structures prior to fluid production. Sand consolidation techniques are aimed at cementing loose sand structures adjacent a wellbore. Such consolidation is effective to prevent breakdown of sand formation and subsequent clogging of producing wells.

In many loosely consolidated or unconsolidated formations, it is not economically or practically feasible to consider sand consolidation techniques. Also, there are many instances where substantial wash-out cavities are either initially present naturally near the wellbore or washed-out cavities form around the wellbore after prolonged use despite previous attempts at sand consolidation.

For these conditions, gravel packing techniques are often used to prevent formation sand production or further erosion and to reestablish the integrity of the wellbore periphery. Gravel packing is a secondary sand consolidation technique involving the introduction of a fluid suspension of exogenous particulate matter downhole to fill the wash-out cavities or to "squeeze" to pack into the formation in the vicinity of the well. The term gravel is somewhat loosely applied in the art to encompass hard, rigid particulate matter ranging in size from a coarse sand to pebble size material.

Once the placement of sand and gravel has been accomplished, a slotted liner or "screen" placed as part of the production string helps hold the loose filling material and retards upstream sand flow through the filler material during production conditions.

Gravel packing can be accomplished by several accepted methods. One method is to place a gravel pack in the well adjacent the entire portion of the formation exposed to the well to form a gravel filter. In a cased perforated well, the gravel may be placed inside the casing adjacent the perforations to form an inside-the-casing gravel pack or may be placed outside the casing and adjacent the formation or may be placed both inside and outside the casing. Various such conventional gravel packing techniques are described in U.S. Pat. Nos. 3,434,540; 3,708,013; 3,756,318; and 3,983,941. These patents are incorporated by reference herein. Such conventional gravel packing techniques have generally been successful in controlling the flow of sand from the formation into the well. Sometimes, however, the gravel pack is unable to preclude fines migration which necessitates costly workovers to be initiated.

Therefore, what is needed is a method to prevent fines migration through a gravel pack so as to prevent costly workovers.

SUMMARY OF THE INVENTION

This invention is directed to a method for controlling sand production in an unconsolidated or loosely consolidated oil or hydro-carbonaceous fluid containing formation or reservoir which is penetrated by at least one wellbore. A gravel packing operation is conducted so as to prevent caving of a washed-out area around said wellbore. Once the gravel packing sand has been placed into the caved out area adjacent the wellbore in the formation, a silicate cement is formed in-situ so as to reduce the permeability of the gravel pack sand while consolidating said pack and area substantially near the wellbore.

In the practice of this invention, an aqueous silicate solution is injected into an interval of the formation containing the gravel pack sand. The aqueous silicate, which is used, is a member selected from the group consisting of an alkali metal silicate, organoammonium silicate, or an ammonium silicate. The aqueous silicate solution enters the interval through perforations made in a cased well penetrating the formation. By use of a mechanical packer, or other means, e.g. size selective gel, penetration of the fluid into the interval can be controlled. As the aqueous silicate solution enters the interval, it saturates said interval.

Once the interval is saturated with the aqueous silicate solution, a spacer volume of a water-immiscible hydrocarbonaceous liquid is directed into the washed-out interval. Hydrocarbonaceous liquids for use herein comprise paraffinic and aromatic liquids. Paraffinic liquids are preferred. Preferred paraffinic liquids are selected from a member of the group consisting of mineral oils, naphthas, $C_5$–$C_{40}$ alkanes, and mixtures thereof.

After a desired spacer volume of hydrocarbonaceous fluid has been placed into the interval requiring sand control, a water-miscible organic solvent containing an alkylpolysilicate (EPS) and an inorganic or organic salt or a chelated calcium is next injected into the interval. Upon coming into contact with the aqueous silicate solution which remains on the sand grains and between the sand grain contact points, EPS and said salt or chelated calcium react with the aqueous silicate solution to form silicate cement in-situ. The silicate cement which is formed is stable at pH's equal to or greater than about 7, and temperatures up to and in excess of about 400° F. These steps can be repeated until fines migration is controlled. Thereafter, production is commenced and substantially fines free hydrocarbonaceous fluids are produced to the surface.

By controlling the strength and rate of injection of the aqueous silicate and solvent containing the EPS mixture which is injected into the interval being treated, the permeability, porosity and consolidation strength of the gravel pack sand and formation can be tailored as desired.

It is therefore an object of this invention to provide for an in-situ silicate cement composition so as to exclude fines and sand from produced hydrocarbonaceous fluids which composition is more natural to a formation's environment.

It is another object of this invention to provide for a composition which will ensure an even flow front, a homogeneous consolidation and uniform porosity so as to substantially exclude the entry of formation fines and sand into a wellbore from an interval treated with said composition.

It is yet another object of this invention to consolidate an unconsolidated or loosely consolidated interval in a formation containing gravel pack sand so as to exclude formation fines or sand.

It is a still yet further object of this invention to provide for a method to obtain a desired permeability within an interval of a formation containing gravel pack sand which can be reversed by treating the interval with a strong acid.

It is an even still yet further object of this invention to provide for a formation consolidation which is resistant to water, high temperatures and high pH's so that the formed gravel pack can be used with enhanced oil recovery (EOR) operations.

It is yet an even still further object of this invention to provide for a consolidation composition lacking a particulate matter therein so as to allow penetration of the composition into an area requiring consolidation.

It is a still even yet further object of this invention to provide for a simple consolidation composition and method which can tolerate water, residual oil and fines.

BRIEF DESCRIPTION OF THE DRAWING

The drawing is a schematic representation showing how the composition is injected into the formation so as to consolidate sand grains while maintaining the porosity of the formation.

DESCRIPTION OF THE PREFERRED EMBODIMENT

In the practice of this invention, sand, preferably gravel packing sand, is directed into a washed out area adjacent to a wellbore that penetrates a hydrocarbonaceous fluid producing zone. The washed out area extends circumferentially from the wellbore into the formation which causes an increased possibility that the wellbore will collapse. Gravel is placed into the washed out area by directing sand through perforations in a casing until the washed out area is filled with the sand. A method which can be used for gravel packing a well is discussed in U.S. Pat. No. 4,945,991 which issued to Jones on Aug. 7, 1990. This patent is hereby incorporated by reference herein.

After the washed-out area has been packed by sand, sand is consolidated by forming a silicate cement in-situ while a desired permeability is retained in the sand within the consolidated washed out area. A silicate cement is formed and binds sand within the washed out area which is sufficient to preclude formation fines or sand from being produced to the surface along with hydrocarbonaceous fluids. As is known by those skilled in the art, core samples taken from the formation containing the washed-out area can be used to determine the extent to which the agent must be applied. A method for determining the saturation characteristics of a porous material is disclosed in U.S. Pat. No. 4,381,665 which issued to Levine et al. on May 3, 1983. This patent is hereby incorporated by reference herein.

In order to form the silicate cement, as shown in the drawing, an aqueous silicate slug is injected into well 10 where it enters formation 12 via perforations 14. As the aqueous silicate slug proceeds through formation 12, it saturates the sand-packed area and near wellbore area of the formation. After saturating the sand-packed area with the aqueous silicate solution selected from a member of the group consisting of an organoammonium silicate, ammonium silicate or alkali metal silicate, a spacer volume of a water-immiscible hydrocarbonaceous liquid 16 is next injected into the sand-packed area. Hydrocarbonaceous liquids for use herein comprise paraffinic and aromatic liquids. Paraffinic liquids are preferred.

This spacer volume of water-immiscible hydrocarbonaceous liquid is selected from a member of the group consisting of mineral oils, naphthas, $C_5$–$C_{40}$ alkanes, and mixtures thereof. The water immiscible hydrocarbonaceous fluid used as a spacer volume may be of an industrial grade. Utilization of the spacer volume should be kept to a minimum in order to keep as much of the organoammonium silicate, alkali metal or ammonium silicate as possible in spaces between the sand grains in the formation. By keeping the maximum amount of said silicate between sand grains, a stronger and more impervious silicate cement will be formed. A spacer volume of the hydrocarbonaceous liquid is used to remove excess silicate from between the sand grains while allowing a thin silicate film to remain on the surface to obtain a subsequent cementing reaction with an injected solvent containing said EPS mixture.

Afterwards, a slug containing a water-miscible organic solvent with EPS and an organic or inorganic salt or a chelated calcium 18 mixed therein is injected into the formation whereupon it displaces any spacer volume of hydrocarbonaceous liquid remaining therein. The water-miscible organic solvent is selected from a member of the group consisting of methanol, ethanol, higher alcohols, glycols, ketones, tetrahydrofuran, and dimethyl sulfoxide. This organic solvent can be of an industrial grade. As the aqueous silicate solution and mixture of EPS and salt or chelated calcium meet, they react simultaneously to form a silicate cement between the sand grains. The cementing reaction takes place so as to bind sand grains in the formation thereby forming a consolidated porous zone 22. Although the sand grains are consolidated, a porous cement is formed which results in a substantially high retention of the formation's permeability. Retention of the formation's permeability allows said EPS mixture slug 18 to move continually through the formation while cement is being formed between sand grains.

Injection of the aqueous silicate slug, spacer volume 16 and EPS mixture slug 18 containing EPS and salt or chelated calcium can be continued until enough cement has been formed to exclude formation fines and sand. As will be understood by those skilled in the art, this amount of cement is formation dependent and may vary from formation to formation. Core samples obtained from the interval to be treated can be tested to determine the required amount of cement. U.S. Pat. No. 4,549,608 which issued to Stowe et al. teaches a method of sand control where clay particles are stabilized along the face of a fracture. This patent is incorporated by reference herein.

In order to increase the cement's consolidation strength, the concentration of the organoammonium silicate, alkali metal silicate or ammonium silicate contained in an aqueous solution slug or the alkylpolysilicate (EPS) and salt or chelated calcium contained in the solvent slug can be increased. Similarly, the flow rates of each of these slugs through the higher permeability zone can be decreased to obtain better consolidation strength. A decreased flow rate is particularly beneficial for increasing the consolidation strength when the EPS and salt or chelated calcium slug's flow rate is decreased. As will be understood by those skilled in the art, optimal concentrations and flow rates are formation dependent. Therefore, optimal concentrations and flow rates should be geared to field conditions and requirements.

Organoammonium silicate, ammonium or alkali metal silicates having a $SiO_2/M_2O$ molar ratio of about 0.5 to about 4 are suitable for forming an alkali stable silicate cement. The metal (M) which is utilized herein comprises sodium, potassium, or lithium. Preferably, the $SiO_2/M_2O$ molar ratio is in the range of about greater than 2. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and form a stronger consolidation due to a higher content of solids.

In those cases where it is not possible to control the viscosity of the silicate solution and preclude entry into another zone, a mechanical packer may be used. The silicate cement which is formed can withstand pH's of 7 or more and temperatures up to an in excess of about 400° F. The preferred silicates are sodium, lithium and potassium. Potassium is preferred over sodium silicate because of its lower viscosity. Fumed silica, colloidal silica, or other alkali metal hydroxides can be added to modify the $SiO_2/M_2O$ molar ratio of commercial silicate. Colloidal silicate can be used alone or suspended in alkali metal or ammonium silicate as a means of modifying silicate content, pH, and/or $SiO_2$ content. In a preferred embodiment, two parts of the aqueous silicate is mixed with one part colloidal silicate.

Organoammonium silicates which can be used in an aqueous solution include those that contain $C_1$ through $C_8$ alkyl or aryl groups and hereto atoms. Tetramethylammonium silicate is preferred.

Alkylpolysilicate (EPS) contained in the water miscible organic solvent is the hydrolysis-condensation product of alkylorthosilicate according to the reaction equation below:

$$(RO)_4Si + nH_2O \xrightarrow[\text{Heat}]{H\pm} (RO)_{4-2n}SiO_n + 2nROH$$

where $n \leq 2$

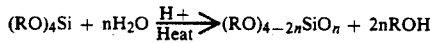

$R = C_1-C_{10}$

R should be $\leq 10$ carbons for good solubility and high $SiO_2$ content.

Tetramethyl (TMS) or tetraethylorthosilicates (TEOS) are preferred alkylpolysilicates. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50%. EPS which is used herein is placed into a water-miscible organic solvent. The preferred solvent is ethanol. Of course, other alcohols can be used. EPS, TMS, TEOS, or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic solvents can be utilized. These solvents include methanol and higher alcohols, glycols, ketones, tetrahydrofuran (THF), and dimethysulfoxide (DMSO).

Although ethanol is the preferred solvent, higher alcohols also can be utilized, as well as other solvents capable of dissolving alkylpolysilicates. The concentration of alkylpolysilicate should be in the range of about 10 to about 100 wt. percent, preferably 20 to about 80 wt. percent. Of course, enough alkylpolysilicate should be used to complete the reaction with the organoammonium silicate, alkali metal or ammonium silicate.

A calcium salt which can be used herein is one which is soluble in alcohol or the water-miscible organic solvent. Calcium chloride hydrate is preferred. However, chelated calcium forms can also be used. Higher alcohols can also be utilized, as well as other solvents capable of dissolving calcium salts and chelates. The concentration of calcium chloride hydrate should be in the range of about 10 to about 40 wt. percent, preferably 20 to about 30 wt. percent. Of course, enough EPS and calcium chloride solution should be used to complete the reaction with the aqueous silicate.

In another embodiment, calcium chloride hydrate or another inorganic or organic salt or chelated calcium can be used alone in the organic solvent to form a silicate cement in the aqueous silicate solution. Similarly, a spacer volume of hydrocarbonaceous liquid is used to separate the calcium chloride solvent slug from the aqueous silicate slug.

While hydrated calcium chloride is preferred, cations of other chlorides can be used. Other chlorides that can be used comprise titanium dichloride, zirconium chloride, aluminum chloride hydrate, ferrous chloride, and chromous chloride.

Once enough cement has been formed to exclude formation fines, hydrocarbonaceous fluids can be produced from formation 12 into well 10. Alternatively, an enhanced oil recovery (EOR) process can be instituted in formation 12 via well 10. EOR processes which can be utilized include steam-flooding, water-flooding, carbon dioxide stimulation and fire-flooding.

Steam-flooding processes which can be utilized when employing this method described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fire-flooding processes which can be utilized herein are disclosed in U.S.

Pat. Nos. 4,440,227 and 4,669,542 which issued to Holmes and Venkatesan, respectively. These patents are hereby incorporated by reference herein. A carbon dioxide EOR process which can be used after forming the gravel pack is disclosed in U.S. Pat. No. 4,513,821 which issued to W. R. Shu on Apr. 30, 1985. This patent is hereby incorporated by reference herein.

Although the present invention has been described with preferred embodiments, it is to be understood that variations and modifications may be resorted to without departing from the spirit and scope of this invention, and those skilled in the art readily understand. Such variations and modifications are considered to be within the purview and scope of the appended claims.

What is claimed:

1. A method for forming a consolidated gavel pack in a washed-out interval adjacent to a borehole in an unconsolidated or loosely consolidated formation comprising:
    a) perforating a cased borehole at an interval of the formation having a washed-out interval adjacent said borehole;
    b) placing sand into said washed-out interval via perforations in the borehole;
    c) injecting an aqueous silicate solution into said interval through perforations contained in the borehole which silicate is of a strength sufficient to react with a water-miscible organic solvent containing an alkylpolysilicate and a member of the group consisting of an inorganic salt, organic salt, or chelated calcium thereby forming a permeability retentive cement where said aqueous silicate is selected from a member of the group consisting of alkali metal silicate, organoammonium silicate, or ammonium silicate;
    d) injecting next a spacer volume of water-immiscible hydrocarbonaceous liquid into said zone; and
    e) injecting thereafter a water-miscible organic solvent containing an alkylpolysilicate and said group member into said interval in an amount sufficient to react with the aqueous silicate so as to form a silicate cement with permeability retentive characteristics whereupon the interval is consolidated in a manner sufficient to form a gravel pack thereby preventing sand from being produced from the formation during the production of hydrocarbonaceous fluids.

2. The method as recited in claim 1 where the alkali metal silicate comprises ions of sodium, potassium, lithium, or ammonium and mixtures thereof.

3. The method as recited in claim 1 where the alkali metal silicate has a silicon dioxide to metal oxide molar ratio of greater than about 2.

4. The method as recited in claim 1 where the salt is calcium chloride.

5. The method as recited in claim 1 where in step d) the water-miscible organic solvent is a member selected from the group consisting of methanol, ethanol, higher alcohols, glycols, ketones, tetrahydrofuran, and dimethly sulfoxide.

6. The method as recited in claim 1 where the silicate is contained in the aqueous solution in an amount of from about 10 to 60 weight percent.

7. The method as recited in claim 1 where alkylpolysilicate is contained in said organic solvent in an amount of about 10 to about 100 weight percent and the salt therein is in an amount from about 10 to about 40 percent.

8. The method as recited in claim 1 where in step d) said alkylpolysilicate is a hydrolysis-condensation product of alkylorthosilicate according to the equation below:

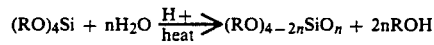

where $n \leq 2$ and $R = C_1-C_{10}$.

9. The method as recited in claim 1 where said silicate cement withstands temperatures in excess of about 400° F.

10. The method as recited in claim 1 where the silicate cement withstands a pH in excess of about 7.

11. The method as recited in claim 1 where the silicon dioxide to metal oxide molar ratio is less than about 4.

12. The method as recited in claim 1 where said organoammonium silicate comprises $C_1$ through $C_{10}$ alkyl or aryl groups and hetero atoms.

13. The method as recited in claim 1 where in step b) said salt is a member of the group consisting of titanium dichloride, zirconium chloride, aluminum chloride hydrate, ferrous chloride and chromous chloride.

14. A method for a consolidated gravel pack in a washed-out interval adjacent to a borehole in an unconsolidated or loosely consolidated formation comprising:
    a) perforating a cased borehole at an interval of the formation having a washed-out interval adjacent said borehole;
    b) placing sand into said washed-out interval via perforations in the borehole;
    c) injecting an aqueous solution of a silicate into said interval through perforations contained in the borehole which solution is of a strength sufficient to react with a water-miscible organic solvent containing an alkylpolysilicate and a member of the group consisting of an inorganic or organic salt or chelated calcium thereby forming a permeability retentive cement where said silicate is selected from a member of the group consisting of alkali metal silicate, organoammonium silicate, or ammonium silicate;
    d) injecting thereafter a spacer volume of a water-immiscible hydrocarbonaceous liquid into said zone in an amount sufficient to remove excess silicate therefrom; and
    e) injecting next a water-miscible organic solvent containing an alkylpolysilicate and said group member into said interval via the perforations in an amount sufficient to react with the aqueous silicate so as to form a silicate cement with permeability retentive characteristics whereupon the interval is consolidated in a manner sufficient to form a gravel pack thereby preventing formation sand from being produced from the formation during the production of hydrocarbonaceous fluids, which solvent is selected from a member of the group consisting of methanol, ethanol, higher alcohols, glycols, ketones, tetrahydrofuran, and dimethyl sulfoxide.

15. The method as recited in claim 14 where in step c) the aqueous solution contains potassium silicate, an in step e) the inorganic salt is calcium chloride hyrdate in an ethanol solvent.

16. The method as recited in claim 14 where the alkali metal silicate comprises ions of sodium, potassium, lithium, or ammonium and mixtures thereof.

17. The method as recited in claim 14 where the alkali metal silicate has a silicon dioxide to metal oxide molar ratio of greater than about 2.

18. The method as recited in claim 14 where the silicate is contained in the aqueous solution in an amount of from about 10 to 60 weight percent.

19. The method as recited in claim 14 where alkylpolysilicate is contained in said organic solvent in an amount of about 10 to about 100 weight percent and the salt therein is in an amount from about 10 to about 40 percent.

20. The method as recited in claim 14 where in step d) said alkylpolysilicate is a hydrolysis-condensation product of alkylorthosilicate according to the equation below:

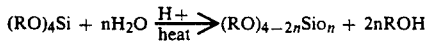

where $n \leq 2$ and $R = C_1 - C_{10}$.

21. The method as recited in claim 14 where said silicate cement withstands temperatures in excess of about 400° F.

22. The method as recited in claim 14 where the silicate cement withstands a pH in excess of about 7.

23. The method as recited in claim 14 where the silicon dioxide to metal oxide molar ratio is less than about 4.

24. The method as recited in claim 14 where said organoammonium silicate comprises $C_1$ through $C_{10}$ alkyl or aryl groups and hetero atoms.

25. The method as recited in claim 14 where in step b) said salt is a member of the group consisting of titanium dichloride, zirconium chloride, aluminum chloride hydrate, ferrous chloride and chromous chloride.

* * * * *